US010120796B2

(12) United States Patent
Moser

(10) Patent No.: US 10,120,796 B2
(45) Date of Patent: Nov. 6, 2018

(54) MEMORY ALLOCATION FOR LONG-LIVED OBJECTS

(75) Inventor: Martin Moser, Speyer (DE)

(73) Assignee: SAP SE, Walldorf (DE)

( * ) Notice: Subject to any disclaimer, the term of this patent is extended or adjusted under 35 U.S.C. 154(b) by 664 days.

(21) Appl. No.: 13/616,701

(22) Filed: Sep. 14, 2012

(65) Prior Publication Data

US 2014/0082315 A1    Mar. 20, 2014

(51) Int. Cl.
*G06F 12/126* (2016.01)
*G06F 12/02* (2006.01)

(52) U.S. Cl.
CPC ...... *G06F 12/0253* (2013.01); *G06F 12/0276* (2013.01)

(58) Field of Classification Search
CPC ............ G06F 12/0276; G06F 12/0253; G06F 12/0261
USPC ........................................................ 707/819
See application file for complete search history.

(56) References Cited

U.S. PATENT DOCUMENTS

| 7,853,628 | B1 * | 12/2010 | Fresko et al. | 707/819 |
|---|---|---|---|---|
| 8,176,100 | B2 * | 5/2012 | Onodera et al. | 707/819 |
| 8,566,812 | B1 * | 10/2013 | Printezis et al. | 717/158 |
| 2002/0138506 | A1 * | 9/2002 | Shuf | G06F 12/0269 |
| 2007/0180002 | A1 * | 8/2007 | Printezis et al. | 707/206 |
| 2008/0109590 | A1 * | 5/2008 | Jung et al. | 711/103 |
| 2008/0216049 | A1 * | 9/2008 | Fournies et al. | 717/100 |
| 2009/0150465 | A1 * | 6/2009 | Branda et al. | 707/206 |
| 2009/0216934 | A1 * | 8/2009 | King et al. | 710/316 |
| 2012/0005406 | A1 * | 1/2012 | Hutchison et al. | 711/103 |
| 2013/0086131 | A1 * | 4/2013 | Hunt et al. | 707/819 |

OTHER PUBLICATIONS

Sangmin Lee, Understanding Java Garbage Collection, Mar. 24, 2012, CUBRID Blog.*
"Annotations", Wikipedia®, [Online]. Retrieved from the Internet: <URL: http://docs.oracle.com/javase/1.5.0/docs/guide/language/annotations.html>, (Accessed Jun. 10, 2012), 4 pgs.
"Garbage collection (computer science)", Wikipedia®, [Online]. Retrieved form the Internet <URL: http://en.wikipedia.org/wiki/Garbage_collection_(computer_science)>, (Accessed May 15, 2012), 13 pgs.

(Continued)

*Primary Examiner* — Ann J Lo
*Assistant Examiner* — Leandro R Villanueva
(74) *Attorney, Agent, or Firm* — Schwegman Lundberg & Woessner, P.A.

(57) ABSTRACT

Managing memory allocations in a computer system may include tagging a class of data structures with a tag that identifies a longer memory-allocation time for objects that correspond to the class. In response to a memory-allocation request for an object, whether or not the object is associated with the tag can be determined through the class. If the object is not associated with the tag, memory can be allocated for the object from a first memory-allocation area that corresponds to a shorter memory-allocation time, and if the object is associated with the tag, memory can be allocated for the object from a second memory-allocation area that corresponds to the longer memory-allocation time.

24 Claims, 11 Drawing Sheets

(56) References Cited

OTHER PUBLICATIONS

"Marker Interface pattern", Wikipedia®, [Online]. Retrieved form the Internet: <URL: http://en.wikipedia.org/wiki/Marker_interface_pattern>, (Accessed Jun. 10, 2012), 2 pgs.
"Memory Mangement in the Java HotSpot™ Virtual Machine", Sun Microsystems, (Apr. 2006), 21 pgs.
"What is an Interface?", [Online]. Retrieved from the Internet: <URL: http://docs.oracle.com/javase/tutorial/java/concepts/interface.html>, (Accessed Jun. 10, 2012), 1 pg.

* cited by examiner

```
1       public interface LongLivedObject {}

// class X implementing LongLivedObject
        public class X implements LongLivedObject {
5
                // attributes
                private int a;
                ...

10              // constructor
                public X() {
                    ...
                }

15              // methods
                public void method1(...) {
                    ...
                }

```
1       public @interface LongLivedObject {}

// class X annotated with LongLivedObject
        @LongLivedObject public class X {
5
                // attributes
                private int a;
                ...

10              // constructor
                public X() {
                        ...
                }

15              // methods
                public void method1(...) {
                        ...
                }

MEMORY ALLOCATION FOR LONG-LIVED OBJECTS

FIELD

The present disclosure relates generally to computer programming and more particularly to memory allocations for software objects used in computer programming.

BACKGROUND

When allocated memory for a software object is no longer in use (e.g., designated as garbage), garbage collection (GC) methods are typically employed to reduce memory fragmentation (e.g., gaps in active memory) and to enable the corresponding memory resources to be reallocated during the session in which the software program is running. Although GC operations are essential for memory management in systems with implicit memory management (e.g., Java, .NET), the computational cost is significant (e.g., linear in the number of active memory elements in the memory heap for each garbage collection). Furthermore, these collections typically require a stop-the-world phase where other operations are suspended while the GC operations are being carried out.

Because a substantial portion of allocated memory often becomes garbage relatively soon after the initial allocation, garbage collections are often carried out more frequently for younger objects as compared with older objects that have survived multiple garbage collections. However, memory is typically allocated similarly for all objects even when information is available to suggest that an object is expected to have a relatively long lifespan. As a result, frequent garbage collections are carried out even for objects that are expected to survive for relatively long times. Thus, there is a need for memory allocation methods that incorporate information related to the expected lifespan of objects for which memory is being allocated.

BRIEF DESCRIPTION OF DRAWINGS

Some embodiments are illustrated by way of example and not limitation in the figures of the accompanying drawings.

FIG. 6 is a code segment that shows an embodiment related to a marker interface.

FIG. 7 is a code segment that shows an embodiment related to a marker annotation.

DETAILED DESCRIPTION

Figure 1:
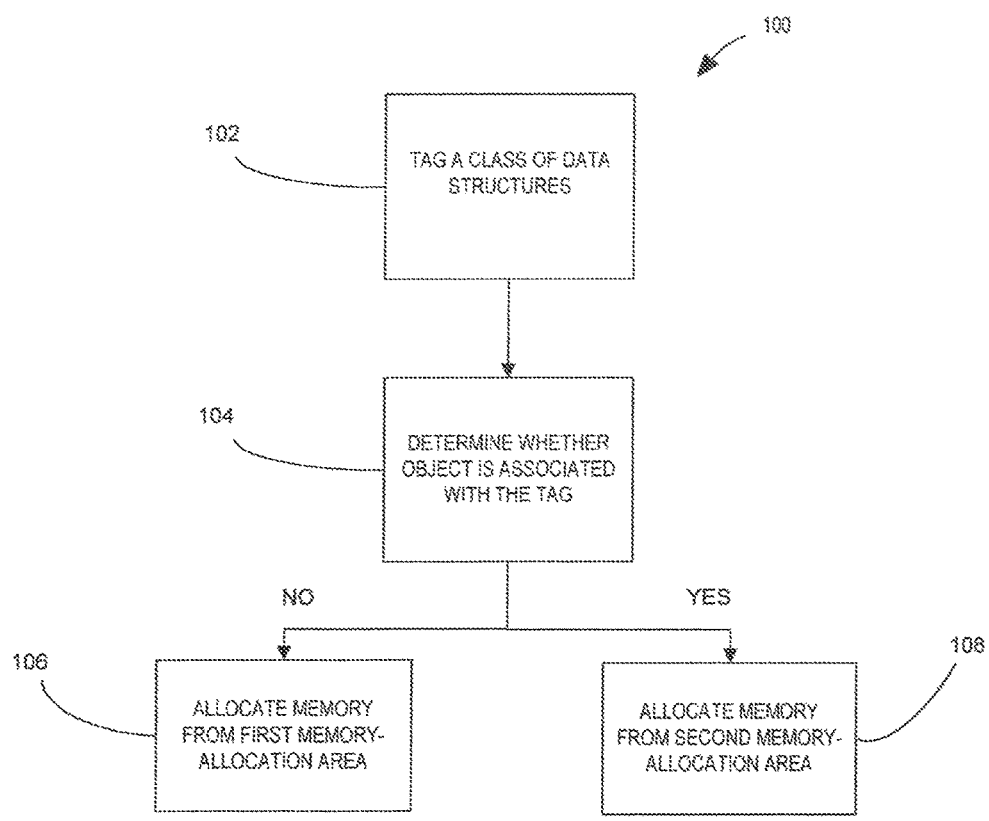
FIG. 1 is a flowchart that shows a method of managing memory allocations in a computer system according to an example embodiment.

Example methods and systems are directed to memory allocations for software objects used in computer programming. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details FIG. 1 shows a method 100 of managing memory allocations in a computer system according to an example embodiment. A first operation 102 includes tagging a class of data structures with a tag that identifies a longer memory-allocation time for objects that correspond to the class. That is, the objects in the class are tagged as long-lived objects because they are expected to persist in memory during execution of the computer program in which they are used. For example, a long-lived object may be expected to persist for the duration of the program's execution or for a threshold portion of the program's execution (e.g., a threshold number of computing cycles). In response to a memory-allocation request for an object, a second operation 104 includes determining whether or not the object is associated with the tag through the class. If the object is not associated with the tag, a third operation 106 includes allocating memory for the object from a first memory-allocation area that corresponds to a shorter memory-allocation time. If the object is associated with the tag, a fourth operation 108 includes allocating memory for the object from a second memory-allocation area that corresponds to the longer memory-allocation time. (Note that the words first and second are used here and elsewhere for labeling purposes only and are not intended to denote any specific spatial or temporal ordering. Furthermore, the labeling of a first element does not imply the presence of a second element.)

Figure 2:
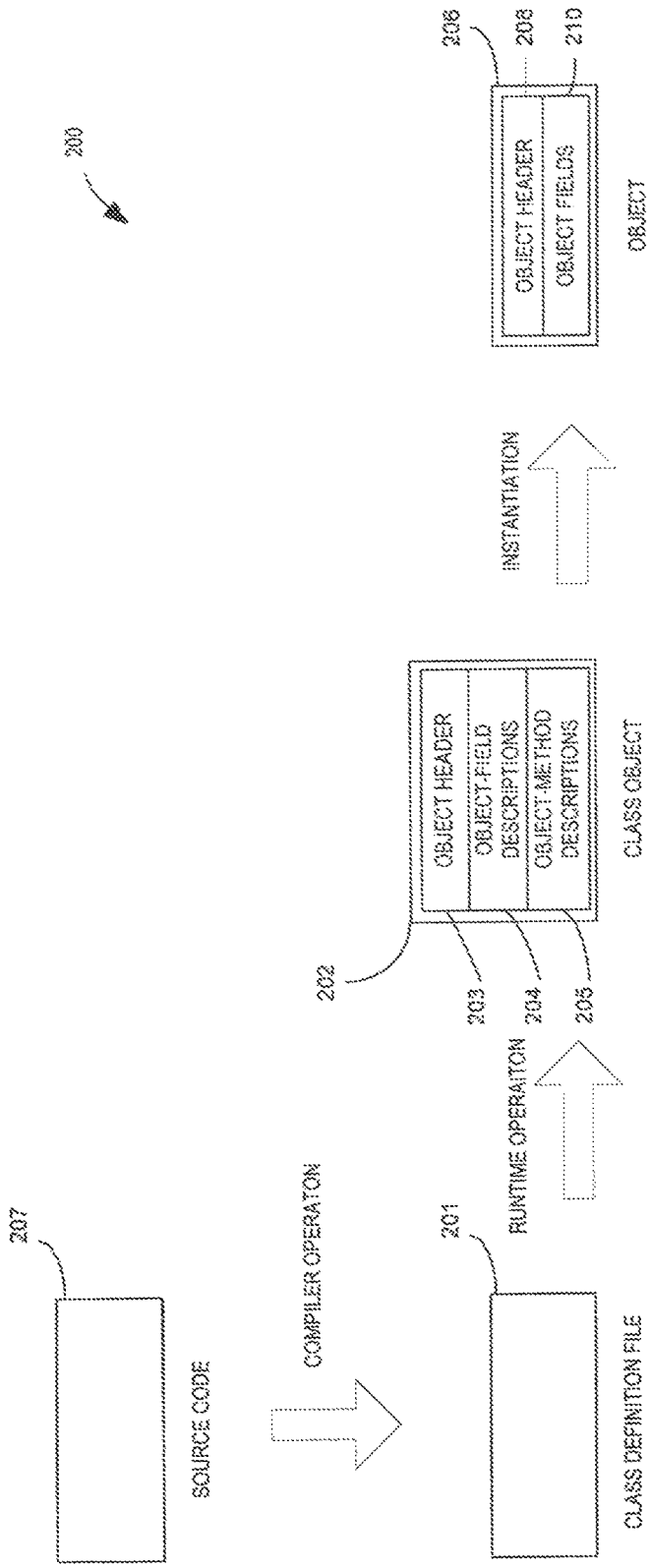
FIG. 2 is a block diagram that shows a memory-allocation process related to the embodiment of FIG. 1.

In the context of object-oriented programming with dynamic memory allocation (e.g., Java, .NET), the memory for the object may be allocated (e.g., in operations 106, 108) as an instantiation of the class. For example, FIG. 2 shows a memory-allocation process 200 where a class object 202 is generated by a runtime system from a class definition file 201 and then used by the runtime system to create an object 206 (e.g., an instance of the class). Prior to these runtime operations, the class definition file 201 was created by a compiler operating on corresponding source code 207 (e.g., Java code). The class object 202 includes an object header 203, object-field descriptions 204, and object-method descriptions 205, and the resulting object 206 includes a corresponding object header 208 and object fields 210. Typically the object header 208 includes fundamental information related to the object 206 including identity hash code, layout, and status in the memory heap (e.g., garbage-collection state, synchronization state). The object-field descriptions 204 describe object fields 210 including, for example, variables and attributes of the object 206. The object-method descriptions 205 describe operations on the object fields 210. As discussed below with reference to FIG. 8, a portion of the object header 203 (or the object header 208) may be used to facilitate the determination of whether or not the object 206 is associated with the tag (e.g., as in operation 104).

Figure 3:
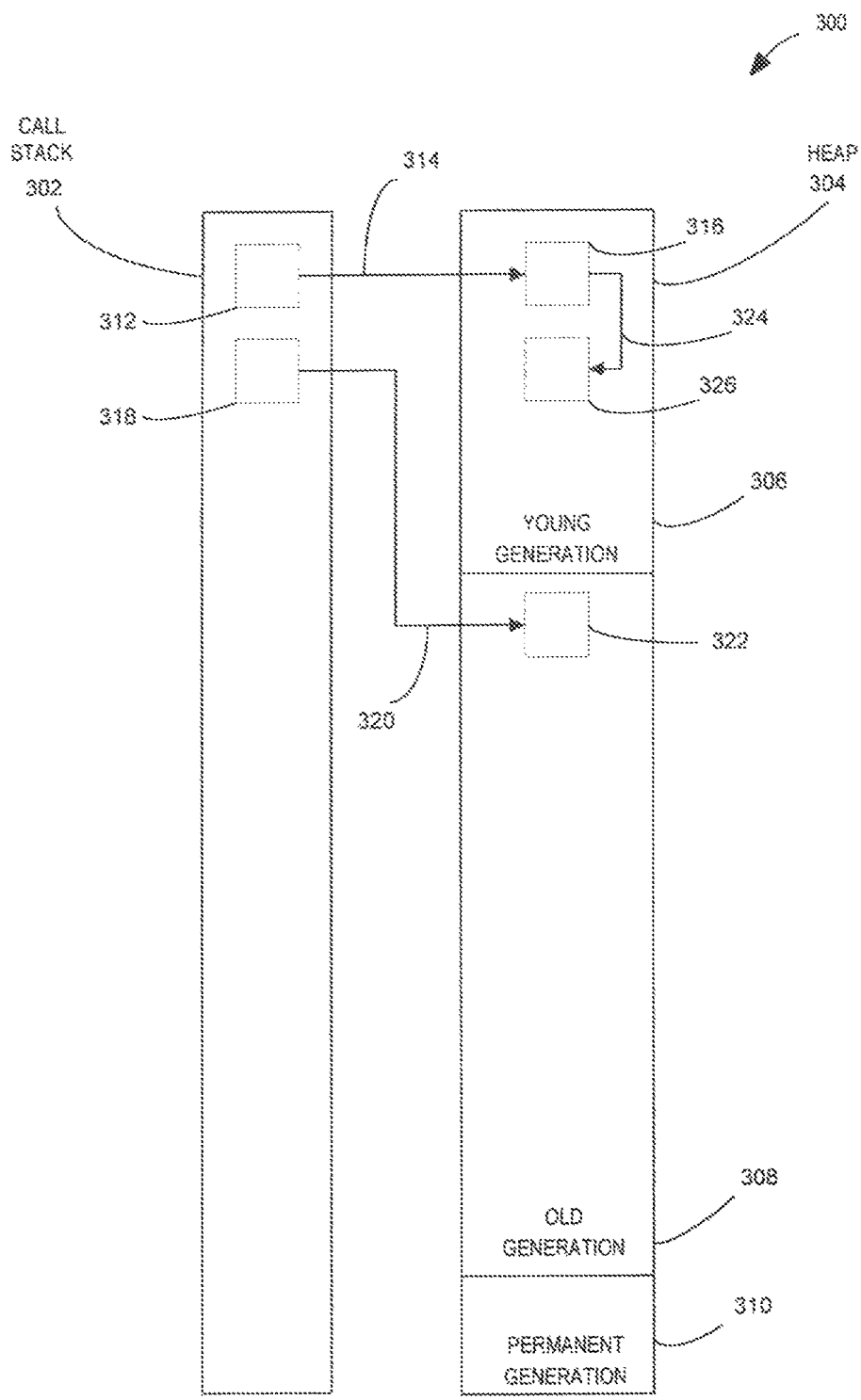
FIG. 3 is a block diagram that shows a simplified memory configuration related to the embodiment of FIG. 1.

Typically the values for the object 206 are stored in a memory configuration that relates to a call stack for a computer program to a heap where object values are stored. FIG. 3 shows a simplified memory configuration 300 that includes a call stack 302 and a heap 304, where the heap 304 includes a young-generation section 306, an old-generation section 308, and a permanent-generation section 310. In some embodiments, the first memory-allocation area that corresponds to a shorter memory-allocation time in operation 106 of FIG. 1 may be identified with the young-generation section 306, and the second memory-allocation area that corresponds to a longer memory-allocation time in operation 108 of FIG. 1 may be identified with the old-generation section 308. FIG. 3 shows an element 312 of the call stack 302 being mapped 314 (e.g., by a pointer) to an element 316 of the heap 304 in the young-generation section 306 and an element 318 of the call stack 302 being mapped 320 to an element 322 of the heap 304 in the old-generation section 308. In addition, element 316 is mapped 324 to element 326 of the heap 304 in the young-generation section 306. These sections 306, 308, 310 are used to organize data to facilitate efficient storage and related garbage-collection processes that are carried out to eliminate unused and outdated elements from the heap 304 as discussed below (e.g., FIGS. 4, 5).

Typically a newly created object is allocated memory in the young-generation section 306 (e.g., specifically in a portion known as Eden). Garbage-collection processes are carried out relatively frequently in the young-generation section 306 because of the high turnover rate for created objects. That is, most objects are no longer used after a relatively short time and so their memory allocations can be eliminated. After a number of program cycles for a period of time), a surviving element of the young-generation section 306 may be transferred to the old-generation section 308 where garbage-collection processes are typically carried out less frequently because these elements are expected to persist for longer times. For example, if elements 322 and 326 are no longer active, then element 316 in the young-generation section 306 can be copied to the element 322 in the old-generation section 308, and the mappings 314, 320, 324 can be replaced by a new mapping between elements 312 and 322. FIG. 3 also shows a permanent-generation section 310, where strings and class definitions (e.g., class object 202) are typically stored and where garbage-collection processes are typically carried out independently or possibly in conjunction with the old-generation section 308. It should be pointed out that in addition to using a number of cycles (or a period to time) to trigger garbage-collection processes, alternative mechanisms include reaching a threshold of usage in one of the sections 306, 308, 310 (e.g., 90% of capacity).

Conventional methods for garbage collection include copy collection and mark-and-sweep collection. Within each of the sections 306, 308, 310 of the heap 304, these methods can be used to compactly copy active elements (e.g., "survivors") in order to reduce memory fragmentation (e.g. gaps between active elements). In general, these active elements or survivors include elements of the heap 304 that are directly reachable from the call stack 302 (e.g., including elements 316, 322) and elements of the heap 304 that are reachable through one or more mappings within the heap 304 starting from a directly reachable element (e.g. including element 326).

Figure 4:
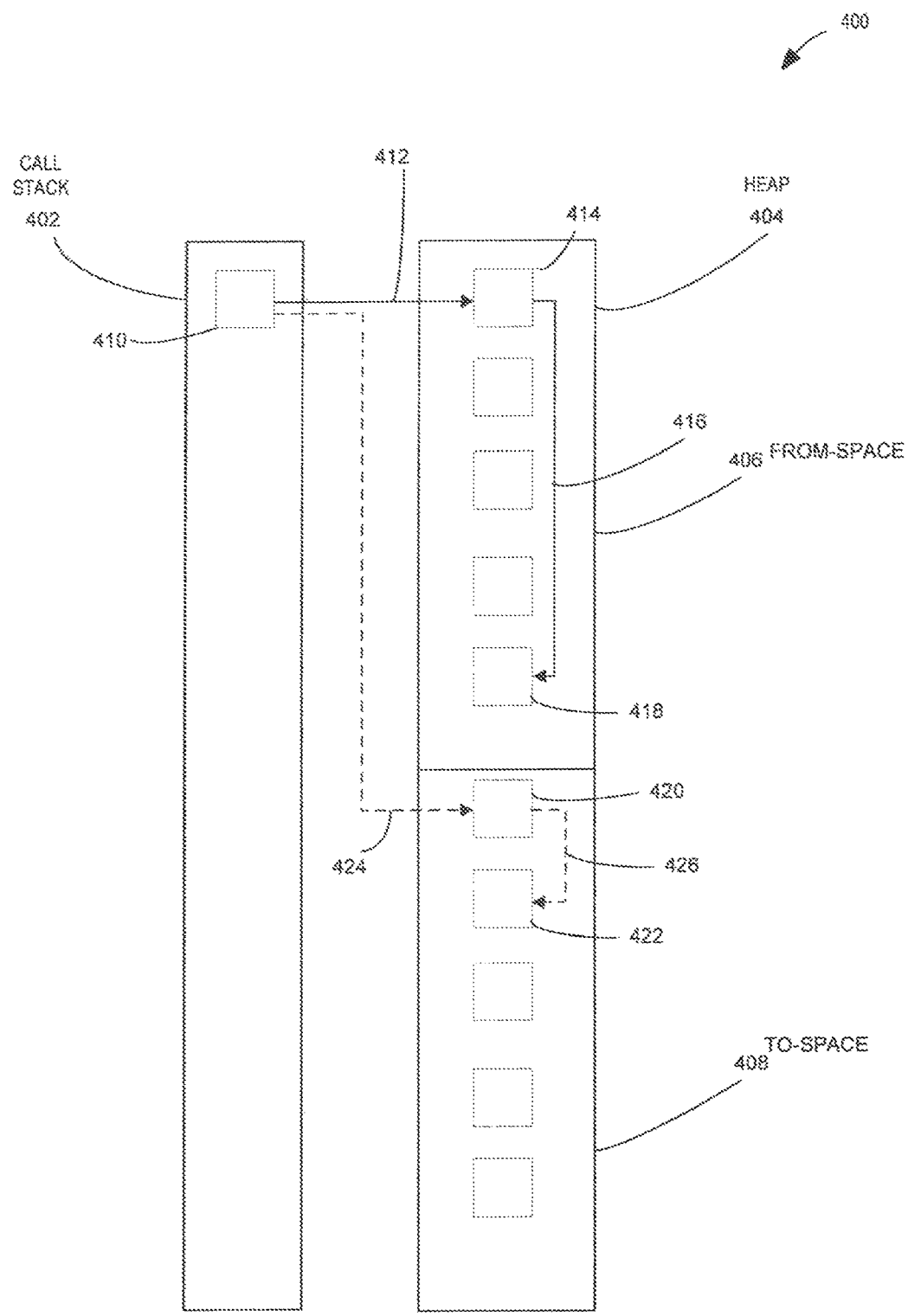
FIG. 4 is a block diagram that shows an embodiment related to a copy collector.

FIG. 4 shows an embodiment where a copy collector 400 is implemented in a simplified configuration that includes a call stack 402 and a heap 404 (e.g., corresponding to one of the sections 306, 308, 310 of FIG. 3). The heap 404 is divided into a from-space 406 and a to-space 408, where only one portion (e.g., the from-space 406) is actively used at a time, and where the garbage collection process includes copying object values from the active space (e.g., from-space 406) to the inactive space (e.g., to-space 408) to eliminate gaps in the actively used memory. For example, in FIG. 4 element 410 in the call stack 402 is mapped 412 (e.g., by a pointer) to element 414 in the from-space 406, where element 414 is mapped 416 to element 418 in the from-space 406. In this case, elements of the from-space 406 between element 414 and element 418 are not actively being used (e.g., not accessible directly from the call stack 402 or indirectly from the call stack 402 through another element of the from-space 406). This fragmentation can be eliminated by compactly copying actively used element values from the from-space 406 to the to-space 408 with reference to a starting location of the to-space 408 (e.g., an upper end). For example, in FIG. 4 element 414 is copied into element 420 and element 418 is copied into element 422, and then mapping 412 is replaced by a mapping 424 between element 410 and element 420, and mapping 416 is replaced by a mapping 426 between element 420 and element 422. This process can be continued with other actively used elements of the from-space 406 so that these elements are also compactly copied into the to-space 408. The currently labeled to-space 408 can then be identified as a new from-space that corresponds to the actively used memory, and the currently labeled from-space 406 can be identified as a new to-space that corresponds to inactive memory. As a result, elements 414 and 418 are now inactive elements of the heap 404.

Figure 5:
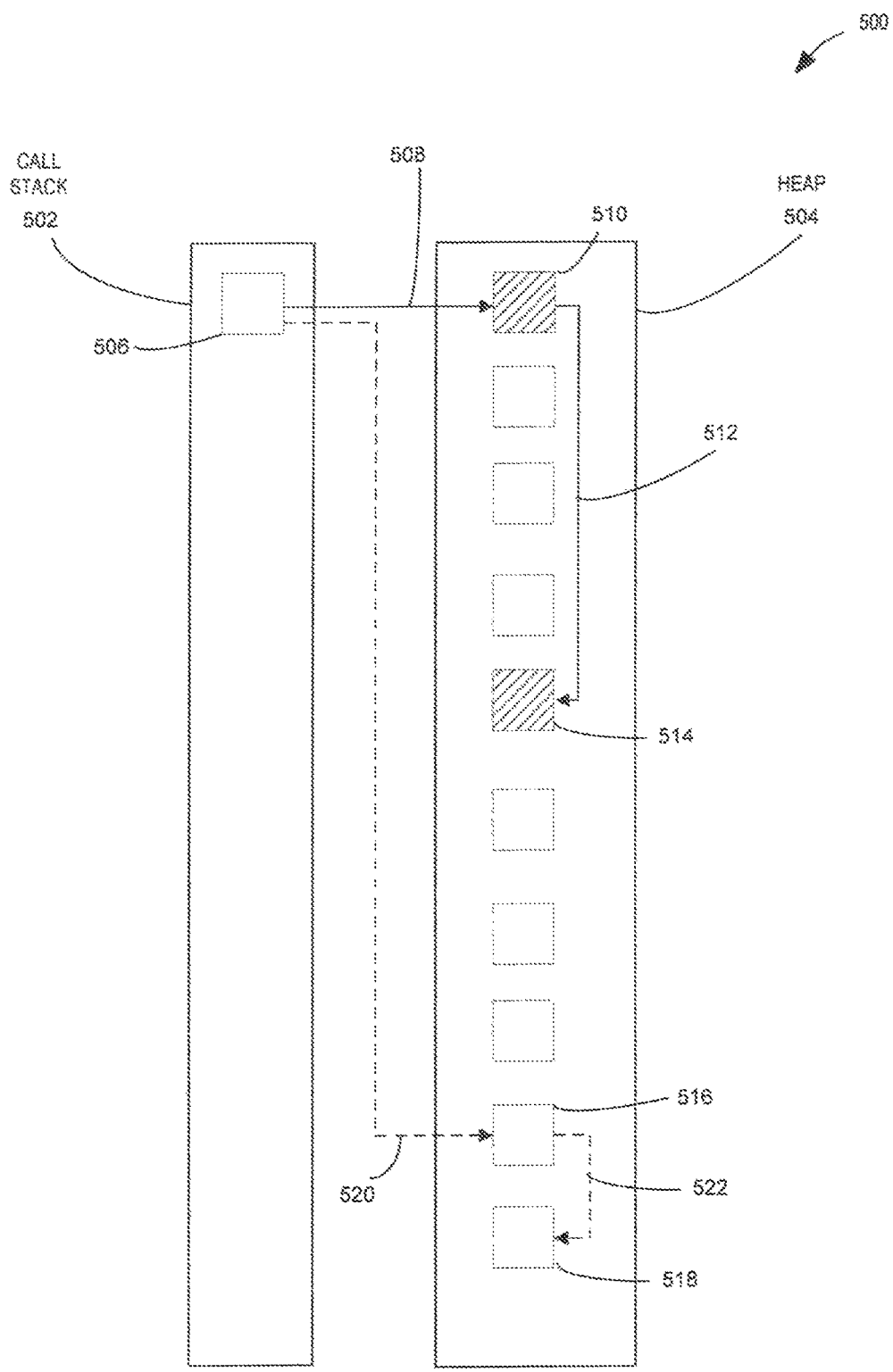
FIG. 5 is a block diagram that shows an embodiment related to a mark-and-sweep collector.

FIG. 5 shows an embodiment where a mark-and-sweep collector 500 is implemented in a simplified configuration that includes a call stack 502 and a heap 504 (e.g., corresponding to one of the heap sections 306, 308, 310 of FIG. 3). Unlike the copy collector 400 of FIG. 4, the mark-and-sweep collector 500 compactly copies elements of the heap 504 without separating the heap into two sections. In a first operation of the mark-and-sweep collector 500, the actively used elements of the heap 504 are marked (e.g., with a bit indicator in a corresponding object header such as the object header 208 of FIG. 2) in a first pass through the heap 504, where as discussed above these active elements include elements of the heap 504 that are directly reachable from the call stack 502 (e.g., including element 510) and elements of the heap 504 that are reachable through one or more mappings within the heap 504 starting from a directly reachable element (e.g., including element 512). (Although not considered in this example, elements of the heap 504 may also be reachable from other sources including class definitions and executable native code.) In FIG. 5 the marked elements 510, 514 are indicated by additional shading. In a second pass through the heap 504, these active elements 510, 514 are compactly copied with reference to a starting location in the heap 504 (e.g., a lower end). In FIG. 5, element 510 is copied to element 516, element 514 is copied to element 518, the mapping 508 is replaced by mapping 520, and the mapping 512 is replaced by mapping 522. As a result, elements 510 and 514 are now inactive elements of the heap 504.

The copy collector 400 requires only one run through survivors of the heap 404 although a doubling of the overall memory of the heap 404 may be required. The mark-andsweep collector 500 requires no additional memory (as compared with the copy collector 400) but requires two runs through the survivors of the heap 504. In some embodiments, the copy collector 400 may be employed in the young-generation section 306 because garbage collections are frequent and only one run through the survivors of the heap 404 is required, and the mark-and-sweep collector 500 may be employed in the old-generation section 308 because the old-generation section 308 is relatively large.

Figure 8:
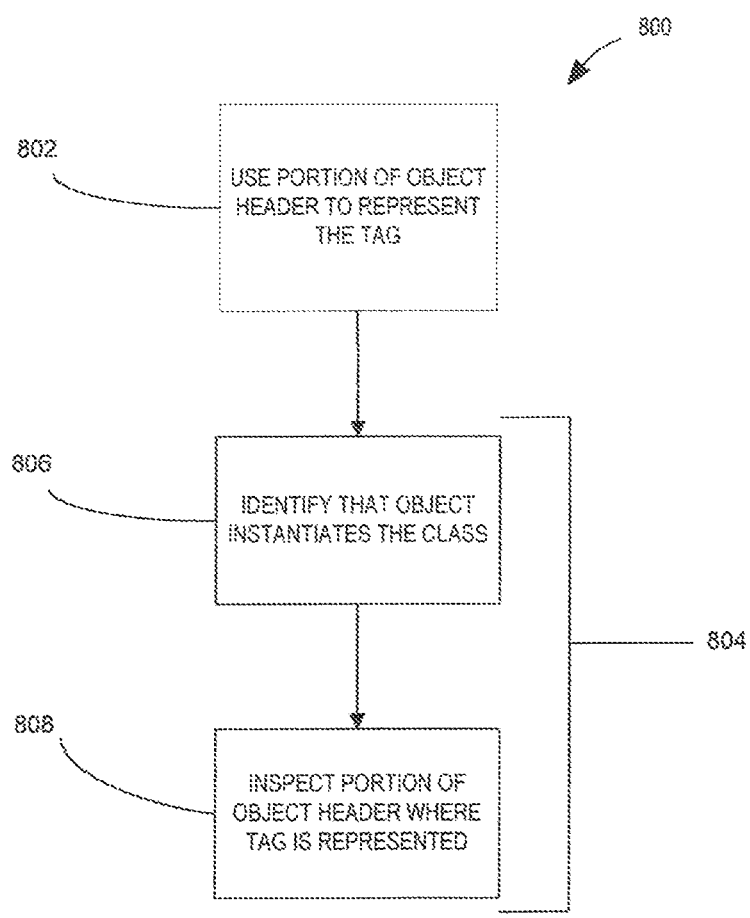
FIG. 8 is a flowchart that shows a method of memory allocation that that uses the object header as provided by the class definition to identify the tag.

With reference to the first operation 102 of FIG. 1, certain embodiments include tagging a class of data structures with a tag that identifies a longer memory-allocation time for objects that correspond to the class so that, with reference to operation 108 of FIG. 1, memory can be allocated from a second memory-allocation area that corresponds to the longer memory-allocation time. Then, for example, rather than implementing a default process (e.g., operation 106) that allocates memory for the object from a first memory-allocation area that corresponds to a shorter memory-allocation time, the object can be identified as long-lived through its class definition and allocated from the second memory-allocation area that corresponds to the longer memory-allocation time. As discussed below with reference to certain embodiments, the tagging of a class (e.g., operation 102) can be implemented using available programming structures such as a marker interface (FIG. 6), a marker annotation (FIG. 7), or an object header 203 (FIG. 8). Then determining whether the object for which memory is to be allocated is associated with the tag (e.g., operation 104) can be implemented by complementary programming methods (e.g., introspection) that can identify these structures.

FIG. 6 shows a simplified Java code segment (e.g., from source code 207) that implements a marker interface for the class definition in order to tag the object in accordance with an example embodiment. Tagging the class (e.g., operation 102) includes associating a marker interface with the class, and determining whether or not the object is associated with the tag (e.g., operation 104) includes determining whether or not the object supports the marker interface through the class (e.g., through introspection). In FIG. 6, the marker interface LongLivedObject is defined at line 1, and the class definition for class X, which implements the marker interface, begins at line 4 and includes one or more attributes, constructors, and methods.

FIG. 7 shows a simplified Java code segment (e.g., from source code 207) that implements a marker annotation for the class definition in order to tag the object in accordance with an example embodiment. Tagging the class (e.g., operation 102) includes associating a marker annotation with the class, and determining whether or not the object is associated with the tag (e.g., operation 104) includes determining whether or not the object supports the marker annotation through the class (e.g., through introspection). In FIG. 7, the marker annotation LongLivedObject is defined at line 1, and the class definition for class X, which is annotated with the marker annotation, begins at line 4 and includes one or more attributes, constructors, and methods.

After the class has been tagged, for example, through a marker interface or a marker annotation, determining whether or not the object for which memory is to be allocated is associated with the tag (e.g., operation 104) can be accelerated by using a portion of the object header 203 that is represented in the class object 202 to represent the tag. For example, an available unused bit of the object header 203 can be used to indicate the presence or absence of the tag, and then determining whether or not the object is associated with the tag can be accomplished by simply examining the value of this bit. FIG. 8 shows a method 800 of memory allocation that uses the object header 203 as provided by the class object 202 to identify the tag. A first operation 802 includes using a portion of an object header 203 corresponding to the class (e.g., class object 202) to represent the tag. For example, when the class object 202 is first generated by the runtime system, the tag can be identified from a corresponding marker interface (e.g., FIG. 6) or marker annotation (e.g., FIG. 7) that is represented in the class definition file 201. Similarly, when an object 206 is instantiated, a relevant marker interface or marker annotation can be accessed from a listing of implemented interfaces or annotations.

An operation 804 for determining that the object 206 is associated with the tag includes an operation 806 for identifying that the object 206 instantiates the class and an operation 808 for inspecting the portion of the object header 203 where the tag is represented in the class object 202. As an alternative to inspecting the object header 203 of the class object 202, one can inspect the object header 208 of the object 206 to identify the tag. However, inspecting the object header 203 of the class object 202 will typically be a more efficient option. For example, once the tag is identified for the class, the corresponding portion in the object header can be calculated once for the first instantiation of the class and then cached in the object header 203. Alternatively, as discussed above, a relevant marker interface or marker annotation for the object 206 can be accessed from a listing of implemented interfaces or annotations.

Figure 9:
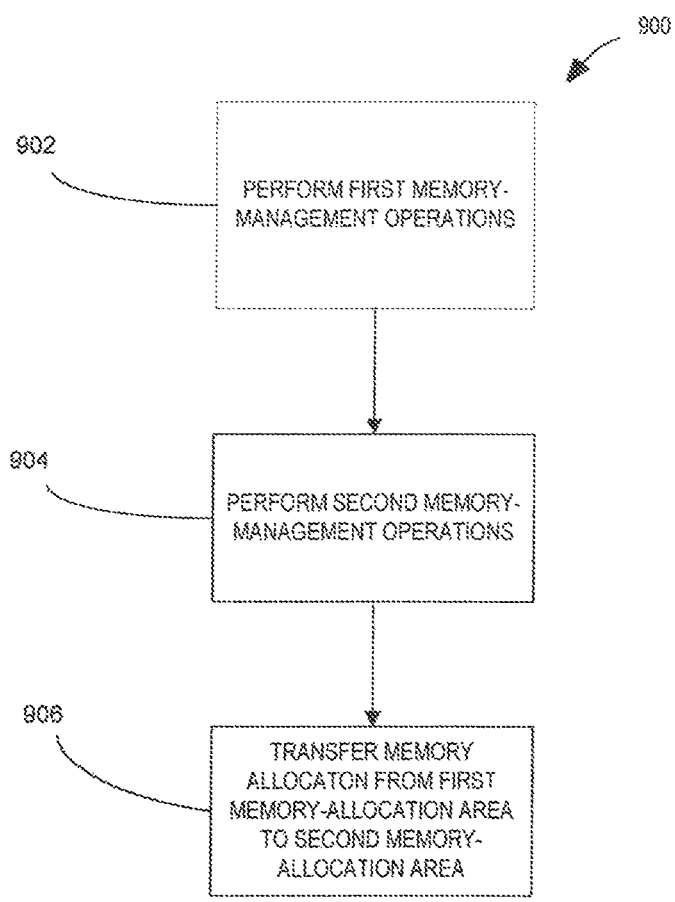
FIG. 9 is a flowchart that shows a method of managing memory allocations that can be used together with the embodiment of FIG. 1.

The embodiments described above enable selective memory allocations for long-lived objects in systems that additionally carry out garbage-collection processes within separate sections 306, 308 of the heap 304 in FIG. 3 for younger and older objects, and additionally enable promotions or memory re-allocation between the young-generation section 306 and the old-generation section 308. FIG. 9 shows a method 900 of managing memory allocations that can be used together with the method 100 of FIG. 1. A first operation 902 includes performing first memory-management operations in the first memory-allocation area that corresponds to a shorter memory-allocation time (e.g. young-generation section 306). A second operation 904 includes performing second memory-management operations in the second memory-allocation area that corresponds to the longer memory-allocation time (e.g., old-generation section 308). A third operation 906 includes transferring a memory allocation for a first object from the first memory-allocation area to the second memory-allocation area if a corresponding memory-allocation time for the first object reaches a threshold value for memory-allocation time in the first memory-allocation area.

Typically, the first memory-management operations are carried out at intervals corresponding to a first time increment and the second memory-management operations are carried out at intervals corresponding to a second time increment that is greater than the first time increment. For example, the first time increment may be a few seconds and the second time increment may be a few minutes. In this way, garbage-collection processes are carried out more frequently in the young-generation section 306 where objects typically expire after a relatively short time.

The first memory-management operations can be based on a copy collection method (e.g., FIG. 4) including operations that copy first-memory-allocation-area survivors from a first portion of the first memory-allocation area to a second portion of the first memory-allocation area. For example, frequent copy collections in a first memory-allocation area (e.g., young generation section 306) benefit from requiring only one run through the survivors of the heap 404. Additionally, the second memory-management operations can be based on a mark-and-sweep collection method (e.g., FIG. 5) including operations that mark second-memory-allocation-area survivors and copy the second-memory-allocation-area survivors into available portions of the second memory-allocation area. For example, a large second memory-allocation area (e.g., old generation section 308) benefits from not requiring additional memory in the heap 504.

Additional embodiments correspond to systems and related computer programs that carry out the above-described methods.

Figure 10:
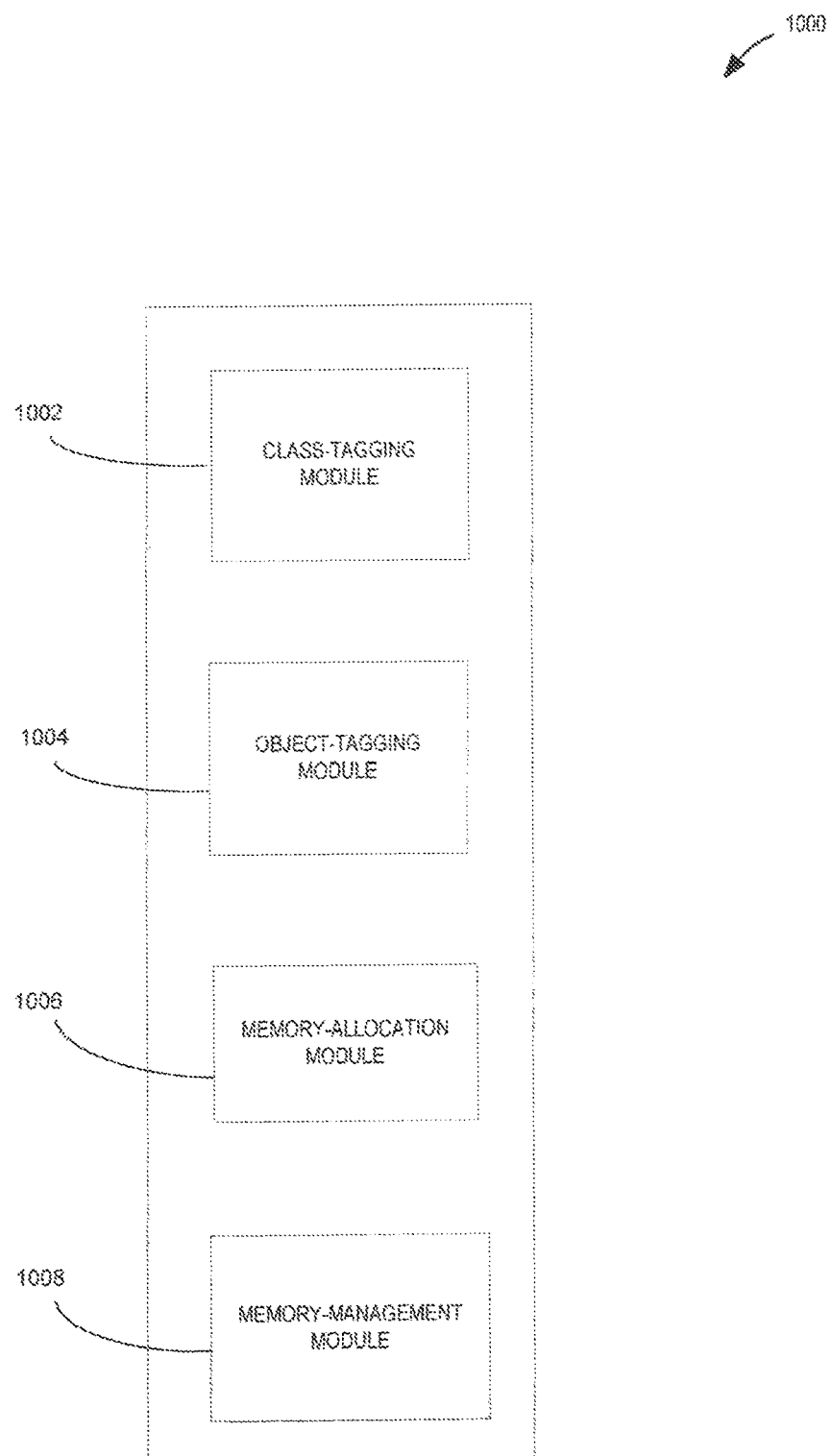
FIG. 10 is a block diagram that shows a schematic representation of an apparatus for an example embodiment.

FIG. 10 shows a schematic representation of an apparatus 1000, in accordance with an example embodiment for managing memory allocations in a computer system. In this case, the apparatus 1000 includes at least one computer system (e.g., as in FIG. 11) to perform software and hardware operations for modules that carry out aspects of the method 100 of FIG. 1.

In accordance with an example embodiment, the apparatus 1000 includes a class-tagging module 1002, an object-tagging module 1004, a memory-allocation module 1006, and an optional memory-management module 1008 (e.g., implementing the method 900 of FIG. 9). The class-tagging module 1002 operates to tag a class of data structures with a tag that identifies a longer memory-allocation time for objects that correspond to the class. In response to a memory-allocation request for an object, the object-tagging module 1004 operates to determine whether or not the object is associated with the tag through the class. The memory-allocation module 1006 performs operations including: allocating memory for the object from a first memory-allocation area that corresponds to a shorter memory-allocation time if the object is not associated with the tag, and allocating memory for the object from a second memory-allocation area that corresponds to the longer memory-allocation time if the object is associated with the tag. The memory-management module 1008 performs operations including: performing first memory-management operations in the first memory-allocation area; performing second memory-management operations in the second memory-allocation area; and transferring a memory allocation for a first object from the first memory-allocation area to the second memory-allocation area if a corresponding memory-allocation time for the first object reaches a threshold value for memory-allocation time in the first memory-allocation area.

Figure 11:
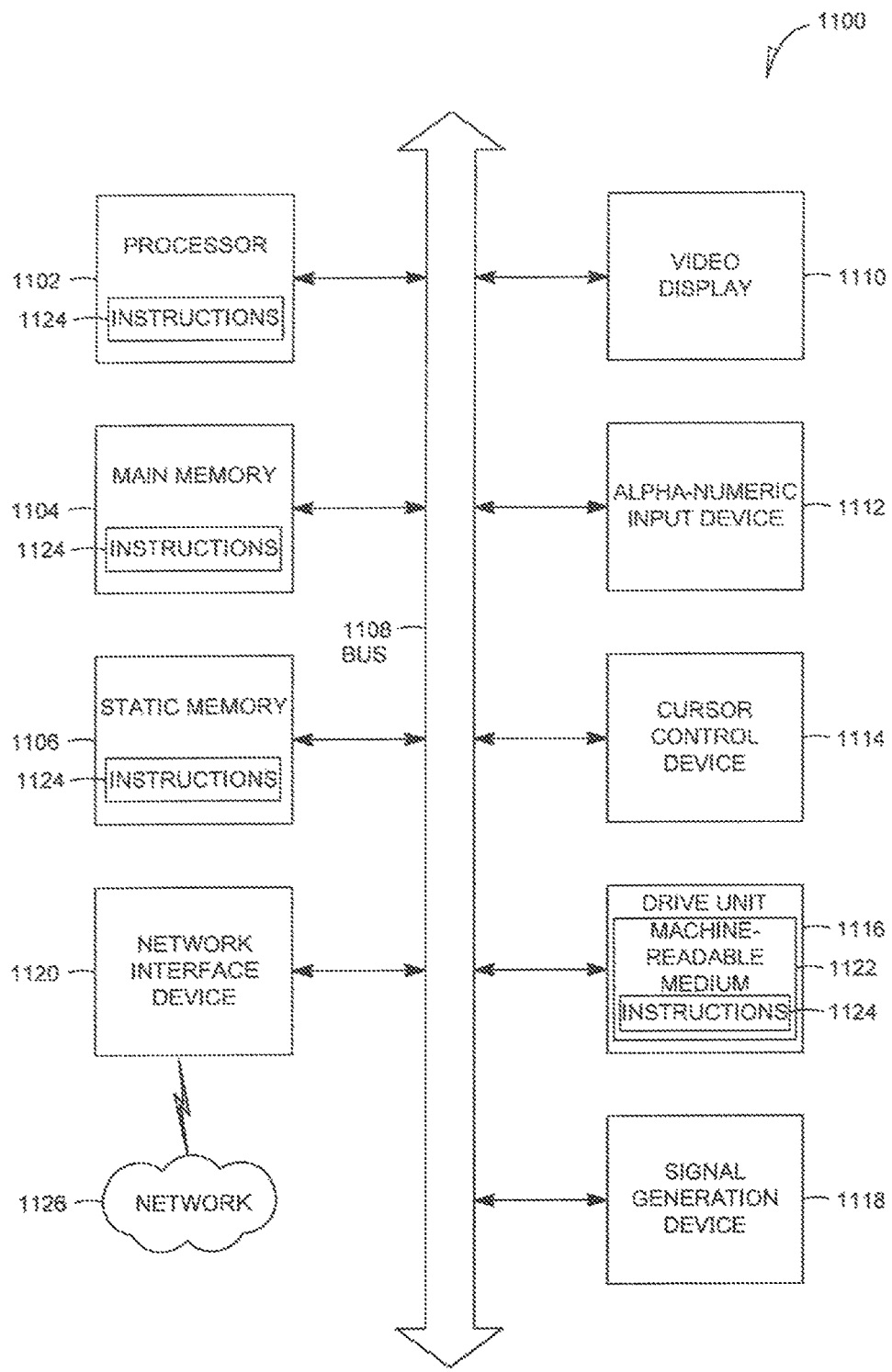
FIG. 11 is a block diagram that shows a computer processing system within which a set of instructions for causing the computer to perform any one of the methodologies discussed herein may be executed.

FIG. 11 shows a machine in the example form of a computer system 100 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) cursor control device 1114 (e.g., a mouse), a disk drive unit 1116, a signal generation device 1118 (e.g., a speaker) and a network interface device 1120.

In some contexts, a computer-readable medium may be described as a machine-readable medium. The disk drive unit 1116 includes a machine-readable medium 1122 on which is stored one or more sets of data structures and instructions 1124 (e.g., software) embodying or utilizing any one or more of the methodologies or functions described herein. The instructions 1124 may also reside, completely or at least partially, within the static memory 1106, within the main memory 1104, or within the processor 1102 during execution thereof by the computer system 1100, with the static memory 1106, the main memory 1104 and the processor 1102 also constituting machine-readable media.

While the machine-readable medium 1122 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 1124. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 1124 may further be transmitted or received over a communications network 1126 using a transmission medium. The instructions 1124 may be transmitted using the network interface device 1120 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

What is claimed is:

1. A method of managing memory allocations in a computer system, the method comprising:
    tagging a class of data structures with a tag that identifies a longer memory-allocation time for objects that correspond to the class, the tag being represented by a programming structure for the tag in a class definition file for the class;
    receiving a memory-allocation request for an object in a runtime operation for managing memory allocations, wherein the object corresponds to the class;
    accessing the class definition file in the runtime operation, the tag being associated with the class in the runtime operation through the programming structure for the tag;
    determining whether or not the object is associated with the tag through the class;
    if the object is not associated with the tag, allocating memory for the object from a first memory-allocation area that corresponds to a shorter memory-allocation time; and
    if the object is associated with the tag, allocating memory for the object from a second memory-allocation area that corresponds to the longer memory-allocation time.

2. The method of claim 1, wherein the object instantiates the class in an object-oriented programming system.

3. The method of claim 1, further comprising:
    using a portion of an object header corresponding to the class to represent the tag; and
    determining that the object is associated with the tag by identifying that the object instantiates the class and inspecting the portion of the object header where the tag is represented.

4. The method of claim 1, wherein the programming structure for the tag corresponds a marker interface;

tagging the class includes associating the marker interface with the class; and
determining whether or not the object is associated with the tag includes determining tether or not the object supports the marker interface through the class.

5. The method of claim 1, wherein the programming structure for the tag corresponds a marker annotation;
tagging the class includes associating the marker annotation with the class; and
determining whether or not the object is associated with the tag includes determining whether or not the object identifies the marker annotation through the class.

6. The method of claim 1, further comprising:
performing first memory-management operations in the first memory-allocation area, the first memory-management operations being carried out at intervals corresponding to a first time increment;
performing second memory-management operations in the second memory-allocation area, the second memory-management operations being carried out at intervals corresponding to a second time increment, the second time increment being greater than the first time increment; and
transferring a memory allocation for a first object from the first memory-allocation area to the second memory-allocation area if a corresponding memory-allocation time for the first object reaches a threshold value for memory-allocation time in the first memory-allocation area.

7. The method of claim 1, further comprising:
performing first memory-management operations in the first memory-allocation area, the first memory-management operations including operations that copy first-memory-allocation-area survivors from a first portion of the first memory-allocation area to a second portion of the first memory-allocation area;
performing second memory-management operations in the second memory-allocation area, the second memory-management operations including operations that mark second- memory-allocation-area survivors and copy the second-memory-allocation-area survivors into available portions of the second memory-allocation area; and
transferring a memory allocation for a first object from the first memory-allocation area to the second memory-allocation area if a corresponding memory-allocation time for the first object reaches a threshold value for memory-allocation time in the first memory-allocation area.

8. The method of claim 1, wherein the class identifies objects that are expected to persist for a threshold number of computing cycles.

9. A non-transitory computer-readable medium that stores a computer program for managing memory allocations in a computer system, the computer program including instructions that, when executed by at least one computer, cause the at least one computer to perform operations comprising:
tagging a class of data structures with a tag that identifies a longer memory-allocation time for objects that correspond to the class, the tag being represented by a programming structure for the tag in a class definition file for the class;
receiving a memory-allocation request for an object in a runtime operation for managing memory allocations, wherein the object corresponds to the class;
accessing the class definition file in the runtime operation, the tag being associated with the class in the runtime operation through the programming structure for the tag;
determining whether or not the object is associated with the tag through the class;
if the object is not associated with the tag, allocating memory for the object from a first memory-allocation area that corresponds to a shorter memory-allocation time; and
if the object is associated with the tag, allocating memory for the object from a second memory-allocation area that corresponds to the longer memory-allocation time.

10. The non-transitory computer-readable medium of claim 9, wherein the object instantiates the class in an object-oriented programming system.

11. The non-transitory computer-readable medium of claim 9, wherein the computer program further includes instructions that, when executed by the at least one computer, cause the at least one computer to perform operations comprising:
using a portion of an object header corresponding to the class to represent the tag; and
determining that the object is associated with the tag by identifying that the object instantiates the class and inspecting the portion of the object header where the tag is represented.

12. The non-transitory computer-readable medium of claim 9, wherein the programming structure for the tag corresponds a marker interface;
tagging the class includes associating the marker interface with the class; and
determining whether or not the object is associated with the tag includes determining whether or not the object supports the marker interface through the class.

13. The non-transitory computer-readable medium of claim 9, wherein the programming structure for the tag corresponds a marker annotation;
tagging the class includes associating the marker annotation with the class; and
determining whether or not the object is associated with the tag includes determining whether or not the object identifies the marker annotation through the class.

14. The non-transitory computer-readable medium of claim 9, wherein the computer program further includes instructions that, when executed by the at least one computer, cause the at least one computer to perform operations comprising:
performing first memory-management operations in the first memory-allocation area, the first memory-management operations being carried out at intervals corresponding to a first time increment;
performing second memory-management operations in the second memory-allocation area, the second memory-management operations being carried out at intervals corresponding to a second time increment, the second time increment being greater than the first time increment; and
transferring a memory allocation for a first object from the first memory-allocation area to the second memory-allocation area if a corresponding memory-allocation time for the first object reaches a threshold value for memory-allocation time in the first memory-allocation area.

15. The non-transitory computer-readable medium of claim 9, wherein the computer program further includes instructions that, when executed by the at least one computer, cause the computer to perform operations comprising:

performing first memory-management operations in the first memory-allocation area, the first memory-management operations including operations that copy first-memory-allocation-area survivors from a first portion of the first memory-allocation area to a second portion of the first memory-allocation area;

performing second memory-management operations in the second memory-allocation area, the second memory-management operations including operations that mark second-memory-allocation-area survivors and copy the second-memory-allocation-area survivors into available portions of the second memory-allocation area; and transferring a memory allocation for a first object from the first memory-allocation area to the second memory-allocation area if a corresponding memory-allocation time for the first object reaches a threshold value for memory-allocation time in the first memory-allocation area.

16. The non-transitory computer-readable medium of claim 9, wherein the class identifies objects that are expected to persist for a threshold number of computing cycles.

17. An apparatus to manage memory allocations in a computer system, the apparatus comprising at least one computer configured to perform operations for computer-executable modules including:

a class-tagging module that tags a class of data structures with a tag that identifies a longer memory-allocation time for objects that correspond to the class, the tag being represented by a programming structure for the tag in a class definition file for the class;

an object-tagging module that:
receives a memory-allocation request for an object in a runtime operation for managing memory allocations, wherein the object corresponds to the class;
determines whether or not the object is associated with the tag through the class, the class definition file being accessed in the runtime operation, and the tag being associated with the class in the runtime operation through the programming structure for the tag; and a memory-allocation module that performs operations including:
if the object is not associated with the tag, allocating memory for the object from a first memory-allocation area that corresponds to a shorter memory-allocation time; and
if the object is associated with the tag, allocating memory for the object from a second memory-allocation area that corresponds to the longer memory-allocation time.

18. The apparatus of claim 17, wherein the object instantiates the class in an object-oriented programming system.

19. The apparatus of claim 17, wherein the class-tagging module uses a portion of an object header corresponding to the class to represent the tag; and
the object-tagging module determines that the object is associated with the tag by identifying that the object instantiates the class and inspecting the portion of the object header where the tag is represented.

20. The apparatus of claim 17, wherein the programming structure for the tag corresponds a marker interface;
tagging the class includes associating the marker interface with the class; and
determining whether or not the object is associated with the tag includes determining whether or not the object supports the marker interface through the class.

21. The apparatus of claim 17, wherein the programming structure for the tag corresponds a marker annotation;
tagging the class includes associating the marker annotation with the class; and
determining whether or not the object is associated with the tag includes determining whether or not the object identifies the marker annotation through the class.

22. The apparatus of claim 17, wherein the computer-executable modules further include a memory-management module that performs operations including:
performing first memory-management operations in the first memory-allocation area, the first memory-management operations being carried out at intervals corresponding to a first time increment;
performing second memory-management operations in the second memory-allocation area, the second memory-management operations being carried out at intervals corresponding to a second time increment, the second time increment being greater than the first time increment; and
transferring a memory allocation for a first object from the first memory-allocation area to the second memory-allocation area if a corresponding memory-allocation time for the first object reaches a threshold value for memory-allocation time in the first memory-allocation area.

23. The apparatus of claim 17, wherein the computer-executable modules further include a memory-management module that performs operations including:
performing first memory-management operations in the first memory-allocation area, the first memory-management operations including operations that copy first-memory-allocation-area survivors from a first portion of the first memory-allocation area to a second portion of the first memory-allocation area;
performing second memory-management operations in the second memory-allocation area, the second memory-management operations including operations that mark second-memory-allocation-area survivors and copy the second-memory-allocation-area survivors into available portions of the second memory-allocation area; and
transferring a memory allocation for a first object from the first memory-allocation area to the second memory-allocation area if a corresponding memory-allocation time for the first object reaches a threshold value for memory-allocation time in the first memory-allocation area.

24. The apparatus of claim 17, wherein the class identifies objects that are expected to persist for a threshold number of computing cycles.

* * * * *